United States Patent [19]

Kaes et al.

[11] Patent Number: 4,832,416
[45] Date of Patent: May 23, 1989

[54] HYDRAULIC VEHICLE BRAKE SYSTEM WITH ANTI-SKID DEVICE

[75] Inventors: Guenter Kaes, Stuttgart; Alwin Stegmaier, Schwieberdingen, both of Fed. Rep. of Germany

[73] Assignee: Robert Bosch GmbH, Stuttgart, Fed. Rep. of Germany

[21] Appl. No.: 161,686

[22] Filed: Feb. 29, 1988

[30] Foreign Application Priority Data

Mar. 11, 1987 [DE] Fed. Rep. of Germany ........ 3707729

[51] Int. Cl.⁴ .............................................. B60T 8/44
[52] U.S. Cl. .................................. 303/110; 180/197; 303/114
[58] Field of Search .................... 180/197; 303/93, 95, 303/100, 102, 110, 111, 114

[56] References Cited

U.S. PATENT DOCUMENTS

| 4,416,347 | 11/1983 | Bertling et al. | 180/197 |
| 4,662,687 | 5/1987 | Leiber | 303/110 |
| 4,743,075 | 5/1988 | Belart et al. | 303/110 X |

FOREIGN PATENT DOCUMENTS

3612793 10/1986 Fed. Rep. of Germany .
2174161 10/1986 United Kingdom .

*Primary Examiner*—Duane A. Reger
*Attorney, Agent, or Firm*—Edwin E. Greigg

[57] ABSTRACT

The proposed vehicle brake system has a hydraulic brake booster, a master brake cylinder, wheel brakes and a pressure source for operating the brake booster. The vehicle brake system also has an anti-skid device, which comprises an auxiliary cylinder with an auxiliary piston and valve assemblies. In the anti-skid situation, the auxiliary piston is acted upon, controlled by one of the valve assemblies, and it acts counter to the brake booster and thereby lowers the pressure in the master brake cylinder. By stopping the valve assembly that is associated with a wheel threatening to skid, the brake pressure in the associated wheel brake drops. Valve assemblies are also further developed such that by including the valve assembly, drive slip at driven wheels can be limited by means of pressure from the pressure source.

23 Claims, 5 Drawing Sheets

HYDRAULIC VEHICLE BRAKE SYSTEM WITH ANTI-SKID DEVICE

BACKGROUND OF THE INVENTION

The invention is directed to improvements in vehicle brake systems.

German Offenlegungsschrift No. 36 12 793 discloses a vehicle brake system having a hydraulic brake booster, an auxiliary cylinder and an auxiliary piston and having a valve assembly as an anti-skid device, and with a pressure source for supplying the brake booster. Triggering the valve assembly actuates the auxiliary piston, which thus counteracts a booster piston of the brake booster, thereby reducing the brake pressures in a master brake cylinder of the brake system and overcoming the danger of skidding. Other valve assemblies are disposed between this master brake cylinder and the wheel brakes so that in the wheel brakes at which there is no danger of skidding, the brake pressures can be kept constant.

United States Patent to Bertling et al. U.S. Pat. No. 4,416,347 discloses a vehicle brake system having a hydraulic brake booster and a device that functions as an anti-skid device or as a drive slip limitation device, as needed. In both modes, the actuation of the at least one brake booster piston is controlled by means of a valve assembly, for both brake pressure generation and brake pressure modulation. In the anti-skid situation, the pressure from a brake valve that supplies the brake booster is modulated by the valve assembly. In the situation where drive slip is being limited, pressure fluid is sent from a pressure source directly into the brake booster by means of the valve assembly. The disadvantage is that whenever anti-slip operation must be interrupted in favor of anti-skid operation, at least one of the master brake cylinder pistons is not in its normal outset position.

OBJECT AND SUMMARY OF THE INVENTION

It is principal object of the invention to provide a vehicle brake system having the advantage that during the automatic generation and variation of brake pressure, for instance for reducing drive slip at one or more wheels and/or for stopping the vehicle on a hill in such a way that it will be easier to start up again, the master brake cylinder pistons need not execute any pumping strokes that generate brake pressure. Accordingly, they are in principle located in their outset positions, which is advantageous for initiating normal braking operations.

It is another object of the invention to provide further exemplary embodiments in which valve assemblies are simply designed using 3/3-way valves that can be found in the prior art.

Still another object is to provide further exemplary embodiments having the advantage that an oil pressure pump already present in the vehicle can be used, even though the wheel brakes themselves are acted upon in the usual manner by a pressure fluid that is typical for that purpose. Further characteristics enable advantageous further developments of and improvements to the vehicle brake system as defined by the invention.

Yet another object of this invention is to provide the advantage that even in operation of the vehicle brake system in drive slip limitation, or while the vehicle is temporarily stopped, the brake pedal can be moved out of its outset position with little force in the usual manner in order to put the vehicle brake system into operation.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
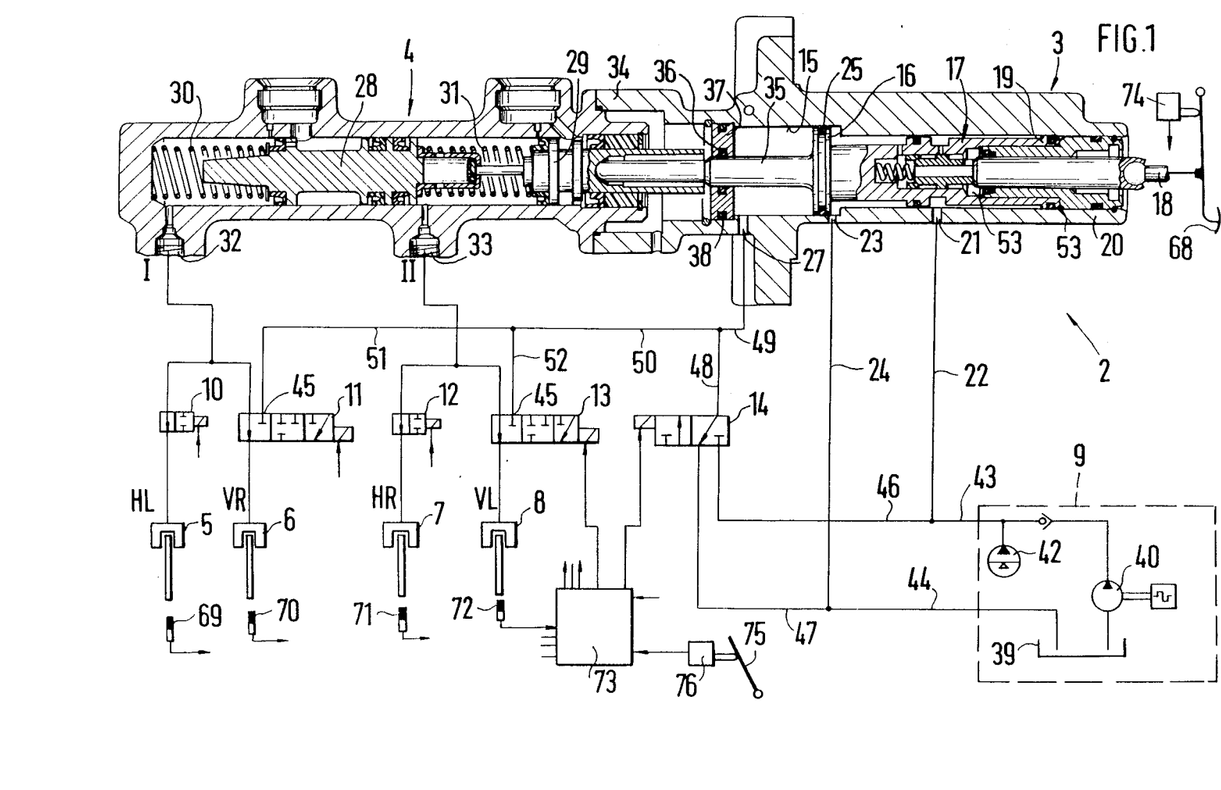
FIGS. 1-5 show five exemplary embodiments of the invention.

The vehicle brake system 2 schematically shown in FIG. 1 has a brake booster 3; a dual-circuit master brake cylinder 4; wheel brakes 5, 6, 7, 8; a pressure source 9 and valve assemblies 10, 11, 12, 13, 14; an auxiliary cylinder 15; and an auxiliary piston 16.

The brake booster 3 includes a brake valve 17, which for example can be taken from the prior art, and which is actuatable by means of a tappet 18 of a brake pedal 68, a booster piston 19 and a booster cylinder 20, in which the booster piston 19 is sealingly displaceably supported. In the present exemplary embodiment, the brake valve 17 is built into the booster piston 19. This provision is solely an example, however, and is not required. For supplying the brake valve 17, the booster cylinder 20 has a connection 21, which communicates via at least one line 22 with the pressure source 9. The booster cylinder 20 also has a return connection 23, which communicates with the pressure source 9 via a return line 24. In the operating direction of the booster piston 19, the auxiliary cylinder 15 is integrally formed with the booster cylinder 20. The auxiliary cylinder 15 has a larger diameter than the booster cylinder 20. The auxiliary piston 16 is sealed off by means of a sealing ring 25 on the auxiliary cylinder 15. The auxiliary cylinder 15 has a connection 27. This auxiliary cylinder connection 27 is located on the end that is located farthest away from the booster piston 19.

In the exemplary embodiment, the dual-circuit master brake cylinder 4 is embodied as a tandem master brake cylinder, the essential individual parts of which are two master cylinder pistons 28 and 29 and two restoring springs 30 and 31. The master brake cylinder 4 has two brake line connections 32 and 33. The master brake cylinder 4 communicates with a pressure fluid reservoir via other connections, not identified by reference numerals. The master brake cylinder 4 is aligned coaxially with the brake booster 3 and secured on a centering extension 34 integrally formed onto the auxiliary cylinder 15. Between the master cylinder piston 29 and the auxiliary piston 16, there is a pressure rod 35 that is integrally formed onto the auxiliary piston 16. This pressure rod 35 is surrounded by a sealing ring 36, which is supported via an annular disk 37. The annular disk 37 is secured sealingly with the aid of a sealing ring 38, on the auxiliary cylinder 15 at its auxiliary cylinder connection 27.

The brake pressure source 9 has a supply container 39, a pump 40 that is supplied from the supply container, a check valve disposed downstream of the pump, and a pressure reservoir 42 disposed downstream of the check valve. From the check valve and the pressure reservoir 42, a pressure line 43 leads out of the pressure source 9. On the other end, a return line 44 leads from the outside to the supply container 29. The return line 24 is connected to the return line 44. The pressure line 22 is similarly connected to the pressure line 43.

In the exemplary embodiment, the wheel brake 5 is associated with a left rear wheel. The wheel brake 6 is associated with a diagonally opposed right front wheel. Both wheel brakes 5 and 6 are supplied with brake pressure from the brake line connection 32 both during normal braking and in anti-skid operation. The wheel brake 7 is associated with a right rear wheel, and the wheel brake 8 is associated with a left front wheel. In the exemplary embodiment, the front wheels associated with the wheel brakes 6 and 8 are embodied as drive wheels. For this reason, under certain conditions, these wheel brakes are to be supplied in the manner according to the invention with brake pressures that are not generated in the master brake cylinder 4. The valve assemblies 11 and 13 located between the brake line connections 32, 33 and the wheel brakes 6 an d8 are therefore embodied as electromagnetically controllable 3/3-way views. In their basic positions, the valve assemblies 11 and 13 connect the brake line connection 32 with the wheel brake 6 and the brake line connection 33 with the wheel brake 8, respectively. In a first switching position, the so-called pressure holding position, these connections are broken. In a third switching position, feed connections 45 are connected to the wheel brakes 6 and 8, respectively. The other wheel brakes 5 and 7 are connected to the brake line connections 32 and 33 merely via 2/2-way valves 10 and 12, respectively.

The valve assembly 14 is connected t o the pressure line 43 and the return line 44 via lines 46 and 47. This valve assembly 14 is embodied very simply as a 3/2-way valve. A line 48 also originating at the 3/2-way valve 14 communicates via a further line 49 with the auxiliary cylinder connection 27. A further line 50 originates at the line 48 and finally communicates via further lines 51 and 52 with the connections 45 of the valve assemblies 11, 13. In the normal position, the valve assembly 14 interrupts a connection between the pressure line 46 and the master cylinder connection 27 and the feed connections 45. In the basic position, however, there is a connection from the auxiliary cylinder connection 27 and the feed connections 45 to the return line 44. If the valve assembly 14 is electromagnetically controlled out of its basic position into the switching position, then the auxiliary cylinder connection 27 and the connections 45 of the valve assemblies 11 and 13 are connected to the pressure line 43 of the pressure source 9.

The vehicle brake system 2 of FIG. 1 functions as follows:

For performing normal braking, the brake valve 17 is actuated via the aforementioned brake pedal 68 and the tappet 18. This disconnects a booster chamber 53 from the return connection 23 and the return line 24. The brake valve 17 then establishes communication between the connection 21 and the booster chamber 53. As a result, pressure fluid from the pressure source 9 passes through the lines 43 and 22 into the booster chamber 53, where it causes a pressure increase. This pressure causes an actuation of the booster piston 19, whereupon the booster piston 19, via the auxiliary piston 16, displaces the pressure rod 35 and thereby the master cylinder piston 29. This generates a pressure in the master brake cylinder 4 that is propagated in the brake line connection 33 and also engages the master cylinder piston 28, displacing it. The master cylinder piston 18, in turn, again generates brake pressures, which is propagated in the associated brake line connection 32. From these brake line connections, the brake pressures pass through the valve assemblies 10, 11, 12, 13, which are in their basic positions, into the wheel brakes 5, 6, 7, 8 that follow. Once a booster pressure, associated with the valve actuation force at the tappet 18, is attained in the booster chamber 53, the communication of the booster chamber 53 with the pressure source 9 is interrupted by the master brake valve 17. If the brake pedal 68 is released, then the tappet 18 and hence the brake valve 17 return to the brake pressure reduction position, causing boosting pressure to escape from the booster chamber 53 through the return connection 23. As a result, the brake pressures at the brake line connections 32 and 33 likewise dissipate.

Wheel rotation sensors 69, 70, 71, 72 are coupled with the wheel brakes 5, 6, 7 and 8, respectively. These sensors 69-72 are connected to inputs of an electronic control unit 73. The control unit 73 monitors the wheel rotation signals and ascertains whether the danger of skidding is present at one or more wheels of the vehicle as a result of possibly excessive brake pressures for the existing road grip. For example, if a wheel rotation sensor coupled with the wheel brake 5 emits wheel rotation signals at a slower rate than wheel rotation sensors coupled with the other wheel brakes, the control unit 73 controls the valve assemblies 11, 12, 13 into their pressure holding positions and the valve assembly 14 into its switching position. This causes pressure fluid from the pressure source 9 to flow through the valve assembly 14 and the auxiliary cylinder connection 27 into the auxiliary cylinder 15. As a result, the auxiliary piston 16 is actuated counter to the booster piston 19 and also displaces the booster piston 19 counter to a force that is exerted by means of the brake pedal 68 via the tappet 18, in the direction of its outset position. The master cylinder pistons 28 and 29 can thus escape the brake pressures generated by them, causing the brake pressures in the brake line connections 32 and 33 to drop; the result, also because of the valve assembly 10 which has remained open, is that the brake pressure in the wheel brake 5 decreases. The decrease in the brake pressure finally ends the danger of skidding, i.e., wheel locking, so that the control unit 73 causes the valve assembly 14 to return to its basic position. This breaks the communication with the pressure source 9, and the auxiliary cylinder 15 is relieved of pressure in favor of the supply container 29. As a result, the auxiliary piston 16 evades the force of the booster piston 19, and the booster piston 19 displaces the master cylinder pistons 29 and 28, so that the brake pressure in the wheel brake 5 rises to its original level. Once the original brake pressure is reached, the valve assemblies 11, 12, 13 are switched to the open position. This process similarly takes place whenever the danger of skidding or wheel locking arises at one of the other wheel brakes 6, 7 or 8.

As already mentioned at the outset, the vehicle brake system 2 is also arranged so that brake pressures can be generated in wheel brakes without requiring an actuation of the brake pedal 68 or the brake valve 17 and the brake booster 3 controlled by it. For example, if a driving wheel connected to the wheel brake 6 is subject to high driving torque yet lacks sufficient grip with the roadway beneath it, it begins to rotate faster, which is likewise recognized by the control unit, which is especially designed for this, via the associated wheel rotation sensor. By feeding brake pressure into the wheel brake 6, excess drive torque can be compensated for with braking moment, thus limiting drive slip. To this end, the control unit 73 again returns the valve assembly 14 into its switching position, so that pressures prevail in the lines 48, 50, 51 and 52 and finally at the feed connections 45 of the valve assemblies 11 and 13. Additionally, the control unit 73 also controls the valve assembly 11 out of its basic position, via the pressure holding position, into the pressure feeding position, in which the master brake cylinder 4 is disconnected from the wheel brake 6 but a communication between the feed connection 46 and the wheel brake 6 is established. As a result, the brake pressure that produces a braking moment for dissipating the excessive drive torque arises in the wheel brake. Accordingly, the rpm of the drive wheel decreases, and this is again recognized by the control unit 73. At the suitable instant, the control unit therefore controls the valve assembly 14 back into its basic position, thus relieving the wheel brake 6 of pressure through the feed connection 45 and the lines 51 and 47 in favor of the supply container 39. The control unit 73 proceeds in the same way if undesirably high drive slip arises at a drive wheel associated with the wheel brake 8. It will be understood that two drive wheels can also be braked at the same time in order to limit the drive slip. This can be done regardless of whether the drive wheels are coupled with one another via a differential pawl or a locking differential, for example.

Advantageously, the aforementioned control unit can also be further developed or arranged such as to generate brake pressures in wheel brakes whenever the vehicle is temporarily stopped, for example at intersections on hills. To this end, the control unit 73 is connected to a signal transducer 74, which is coupled with the brake pedal 68, and to a further signal transducer 76, which is coupled to a driving pedal 75. A control logic element installed in the control unit 73 recognizes from the signals that the vehicle has been stopped by means of the brake pedal 68. As a result, the valve assembly 14 is controlled into the pressure feeding position. By simultaneously reversing the valve assemblies 11 and 13, the feed pressure is fed into the wheel brakes 6 and 8, so that the vehicle is now kept at a standstill even if the brake pedal 68 is released. Only when an actuation of the drive pedal 75 signals to the control unit 73 that the wheel brakes should be released does the control unit cause the valve assemblies 11, 13 and 14 to return to their outset positions.

Figure 2:
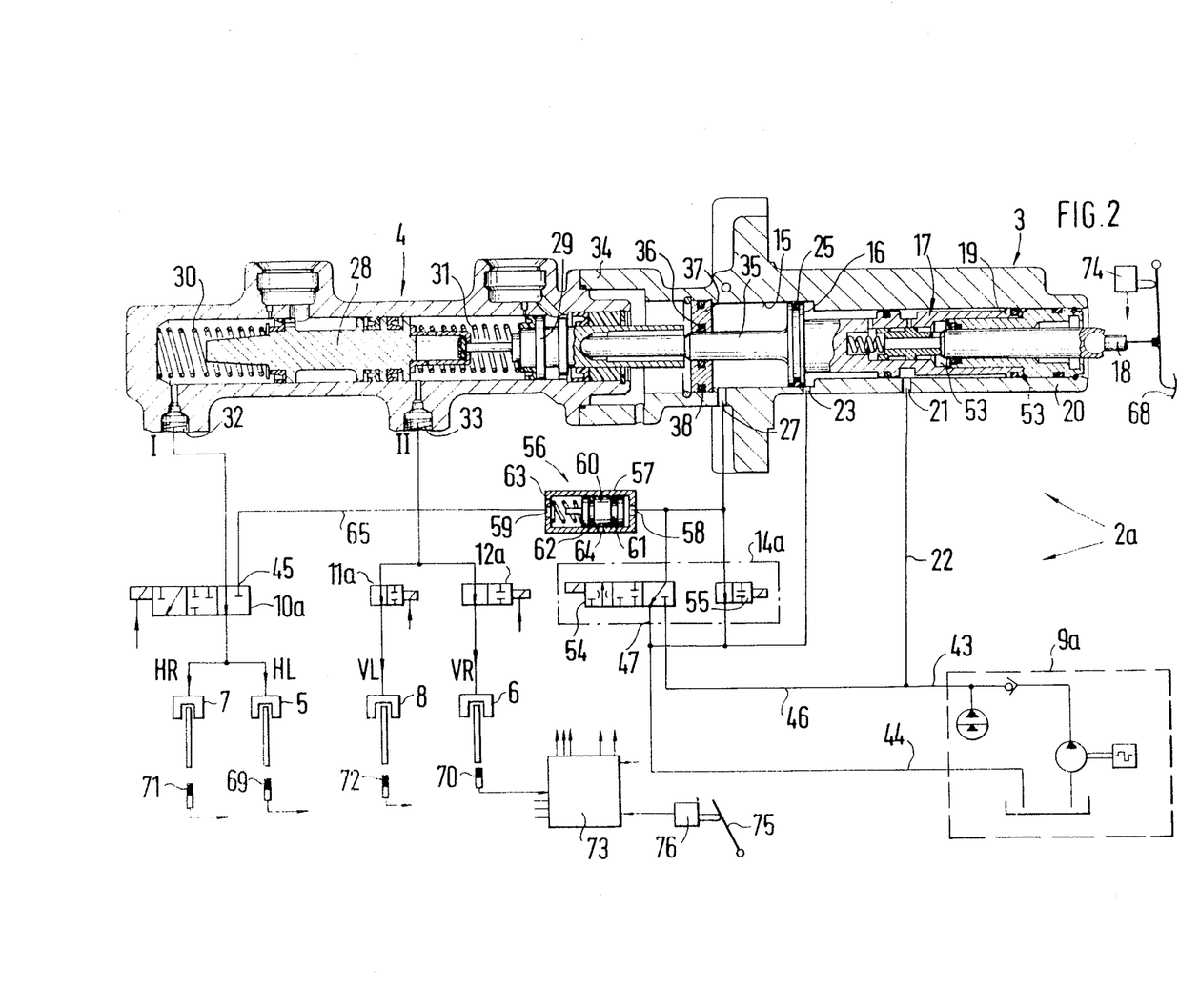

The exemplary embodiment of a vehicle brake system 2a shown in FIG. 2 differs from that of FIG. 1 essentially in that a pressure source 9a contains mineral oil, for example, instead of the pressure fluid typical for brake systems. The brake system is also simplified by providing that valve assemblies 10a, 11a, 11b are arranged only for anti-skid operation and for keeping the vehicle stopped in the period between braking and restarting. The brake booster 3 functions in the above-described manner, so that upon an actuation of the brake pedal 68, brake pressures are available at the brake line connections 32 and 33. In this case, the wheel brakes 5 and 7 of a rear axle are associated with the brake line connection 32, while the wheel brakes 6 and 8 of front wheels are associated with the brake line connection 33. In anti-skid operation, the brake pressures of the rear wheel brakes 5 and 7 are varied in common through the valve assembly 10a. This valve assembly 10a is in its basic position at that time. Because front wheels contribute significantly more to the total braking force than rear wheels, the front wheel brakes 6 and 8 are each assigned their own valve assemblies 12a and 11a, respectively, via which the wheel brakes 6 and 8 are connected to or disconnected from the brake line connection 33. Brake pressure reductions are controlled in the manner described above by triggering these valve assemblies 10a, 11a, 12a and a valve assembly 14a. Differing from the exemplary embodiment of FIG. 1, the valve assembly 14a in this embodiment includes a 3/3-way magnetic valve 54 between the pressure source 9a and the auxiliary cylinder connection 27, and a 2/2-way magnetic valve 55 between the auxiliary cylinder connection 27 and a return line 44 of the pressure source 9a. In its basic position, the magnetic valve 55 is opened, so that upon displacement of the booster piston 19 for building up brake pressures, the auxiliary piston 16 can escape in the direction of the master brake cylinder. The magnetic valve 54 is also in a basic position, in which it connects the auxiliary cylinder connection 27 with the return line 44. For pressure relief of the auxiliary cylinder 15, two magnetic valves 54 and 55 are thus available, so that there is redundancy. As a result, with a high degree of safety, a pressure relief is present whenever it is necessary for the sake of a braking action controlled by means of the brake pedal 68. As a first switching position, the valve 54 has a so-called pressure holding position, in which all the connections are blocked off from one another, and a second switching position, by means of which the auxiliary cylinder connection 27 is connected to the pressure line 46. This second switching position is again, logically, provided in order to feed pressure into the auxiliary cylinder 15 and to act upon the auxiliary piston 15, so that the auxiliary piston 15 acts counter to the booster piston 19. As already indicated above, in the master brake cylinder 4, brake pressure modifications become effective, as a result of suitable switching positions of the valve assemblies 10a, 11a, 12a, at whichever wheel brake was threatening to lock, or skid.

Because the mineral oil of the pressure source 9a must not be allowed to mix with the fluid in the master brake cylinder 4 and in the wheel brakes 5-8, a fluid separating device in the form of a floating piston device 56 is installed between the valve assembly 14a and the valve assembly 10a. This device has a cylinder 57 with connections 58 and 59 at its ends, a piston 60 with two sealing rings 61 and 62, a restoring spring 63 and a relief opening 64. The connection 58, like the auxiliary cylinder connection 27, is connected to the valve assembly 14a. The connection 59 communicates via a line 65 with a feed inlet 45 of the valve assembly 10a. The restoring spring 63 is built into the cylinder 57 in such a way that it urges the piston 60 in the direction of the connection 58. The relief opening 64 is disposed substantially over half the length of the cylinder 57 in such a way that upon a displacement of the piston 60 between its end positions, the sealing rings 61 and 62 do not overtake the relief opening 64. To this end, the sealing rings are spaced apart from one another by a distance greater than the displacement travel of the piston 60 in the cylinder 57.

If the situation arises in which, after having been braked to a standstill by means of the brake pedal 68, the vehicle is to be kept stopped, then once again the control unit 73 controls the valve assembly 14a into a switching position that effects a connection of both the auxiliary cylinder connection 27 and the connection 58 of the floating piston device 56 with the pressure line 43 of the pressure source 9a. As a consequence, by means of the mineral oil entering through the connection 58, the piston 60 is urged in the direction of the connection 59, counter to the action of the restoring spring 63, in such a way that the piston 60 positively displaces a pressure fluid, of the kind typically used for the wheel brakes, through the line 65 toward the feed connection 45. The control unit 73 now needs merely to control the valve assembly 10a into its second switching position, producing braking pressure in the wheel brakes 5 and 7 to keep the vehicle at a stop. During the feeding of mineral oil into the floating piston device 56, the valve 55 is controlled into its blocking position, so that mineral oil cannot flow into the return line 44 without being utilized. If the driving pedal is then actuated, the control unit 73 controls both valve 54 and 55 and the valve assembly 10a back into their basic positions, so that the brake pressures dissipate from the wheel brakes 5 and 7. As the drawing and the reference numerals show, a front-and-back brake circuit layout has been selected here, in contrast to the so-called diagonal brake layout of the exemplary embodiment of FIG. 1. It is understood that the vehicle brake system 2 can also be further arranged for limiting drive slip, by installing a plurality of 3/3-way valve assemblies between the brake line connections 32 and 33 and the wheel brakes 5–8.

Figure 3:
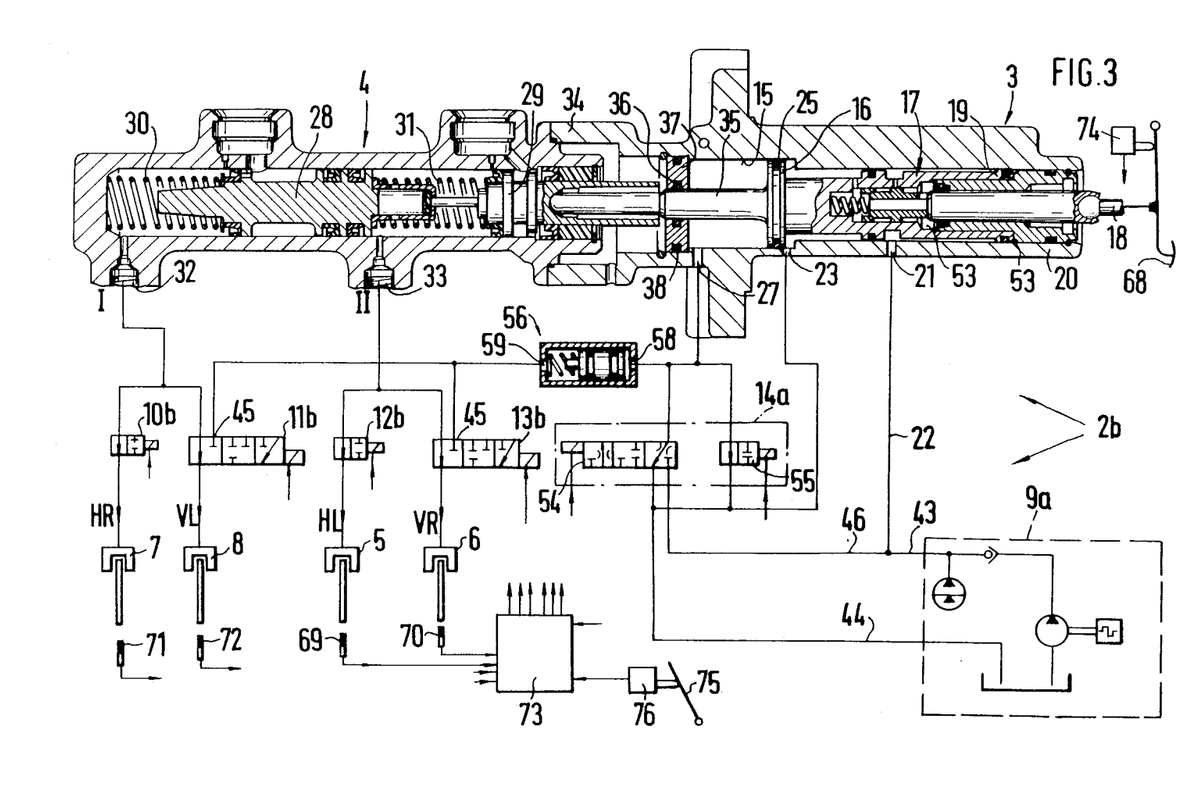

The exemplary embodiment of a vehicle brake system 2b according to FIG. 3 once again has a brake booster 3, a master brake cylinder 4, wheel brakes 5–8, a pressure source 9a, a valve assembly 14a and a floating piston device 56. Between the brake line connection 32 and the wheel brake 7, a valve assembly 10b is provided. A valve assembly 13b is installed between this brake line connection 32 and the associated wheel brake 8. Similarly, a valve assembly 12b is provided between the brake line connection 33 and the wheel brake 5, and a valve assembly 12b is provided between this brake line connection 33 and the wheel brake 6. The valve assemblies 12b and 10b are intended solely for anti-skid operation, and are therefore embodied as 2/2-way valves. The valve assemblies 11b and 13b serve to limit drive slip and/or for briefly keeping the vehicle at a stop prior to starting up again. To this end, the valve assemblies 11b and 13b are again embodied as 3/3-way valves with feed connections 45. The connections 45 are in turn connected to an outlet 59 of the floating piston device. The floating piston device, in turn, is connected via its connection 58 to the valve assembly 14a again. This exemplary embodiment again has a so-called diagonal brake circuit layout. For this reason, if driven front wheels, for instance, are the wheels via which the vehicle is temporarily kept at a stop, then two valve assemblies 11b and 13b embodied as 3/3-way valves are necessary. Since the valve assemblies 10b, 11b, 12b, 13b and 14a are technical equivalents to the valve assemblies described above, the functioning of this exemplary embodiment need not be described here.

Figure 4:
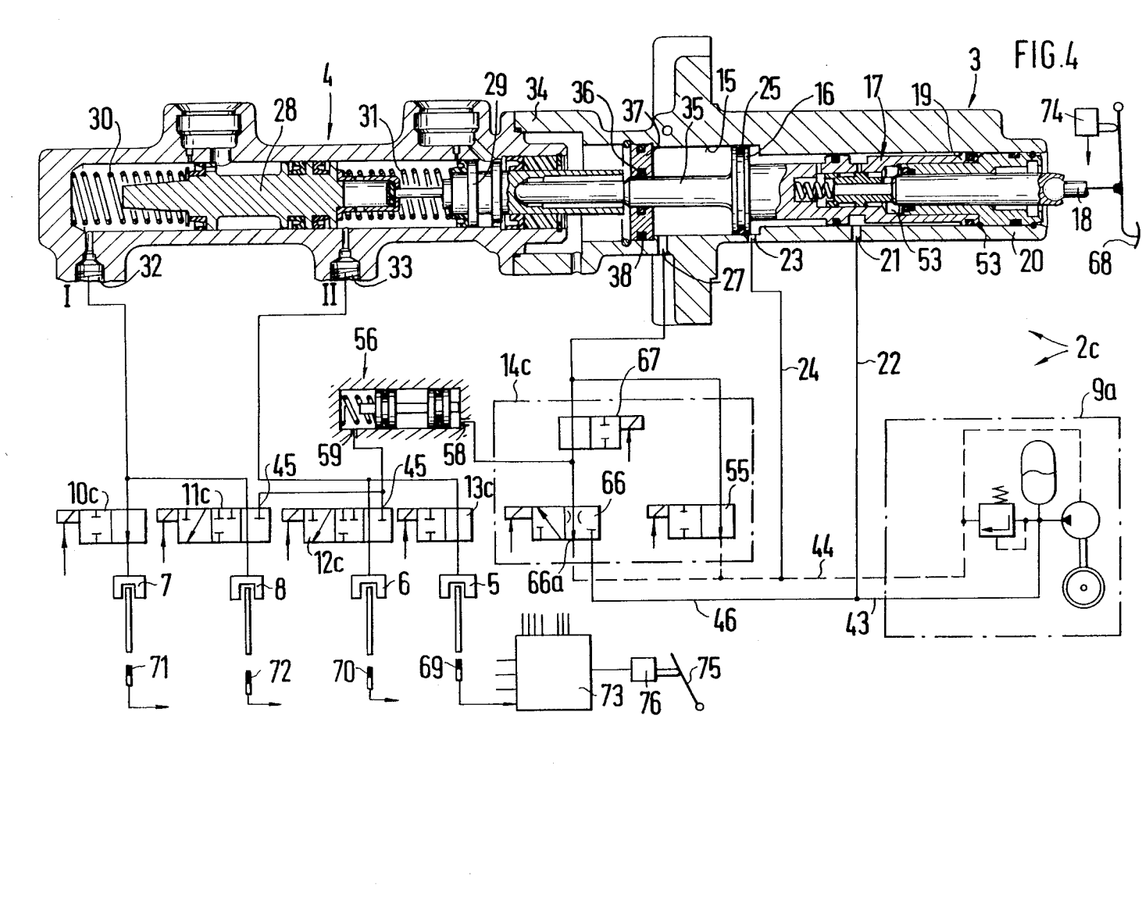

The exemplary embodiment of a vehicle brake system 2c shown in FIG. 4 includes a brake booster 3; a master brake cylinder 4 with master cylinder pistons 28 and 29 and brake line connections 32 and 33; wheel brakes 5, 6, 7, 8; a pressure source 9a; valve assemblies 10c, 11c, 12c, 13c and 14c; an auxiliary cylinder 15c with an auxiliary piston 16; and a pressure rod 35 between the brake booster 3 and the master brake cylinder 4. The wheel brakes 6 and 8 of two drive wheels are distributed to the brake line connections 32 and 33. The valve assemblies 11c and 12c associated with these wheel brakes 6 and 8 are again embodied as 3/3-way valves and provided with feed connections 45. These feed connections 45 are once again connected to one connection 59 of the floating piston device 56 common to the other exemplary embodiments. One connection 58 of this floating piston device 56 is connected to the valve assembly 14c. The wheel brakes 5 and 7 are associated with wheels that are not drivable, so that they are connectable with or disconnectable from the respective brake line connection 32 or 33 via valve assemblies 10c and 13c embodied merely as 2/2-way valves.

The valve assembly 14c here differs from the exemplary embodiments described above. It does include the above-described valve 55 between an auxiliary cylinder connecting 27 and a return line 44 that leads to the pressure source 9a, however. Between the floating piston device 56 and a pressure line 46, which is supplied from the pressure source 9a, a 3/2-way valve 66 is installed. In its basic position, this valve 66 connects the connection 58 of the floating piston device 56 with the return line 44. The 3/2-way valve 66 may be embodied in such a way that in its basic position, it functions as a throttle. In its second position, the switching position, the 3/2-way valve 66 connects the pressure line 46 with the connection 58. In this switching position, and also through a 2/2-way valve 67 disposed between the 3/2-way valve 66 and the auxiliary cylinder connection 27, the pressure source 9a supplies pressure to the auxiliary cylinder 15 in the anti-skid situation. To prevent pressure fluid from escaping unused to the return line 44, the valve 55 is closed as well during anti-skid operation, in the manner described above. If brake pressure is required in the wheel brakes for drive slip limitation, then the 2/2-way valve 67 can be controlled into its blocking position; as a result, despite the desired increase in brake pressure in the wheel brakes involved, the auxiliary cylinder 15 remains pressureless. This has the advantage that the brake pedal can be moved out of its basic position without a notable exertion of force, or in other words in the normal manner. As a result, brake pressure can be arbitrarily generated in the master brake cylinder 4 by the driver by means of the brake pedal 68, without a substantial change in the pedal characteristic. This brake pressure can then be supplied for instance to the wheel brakes 5, 7 that are not being used for drive slip limitation.

It should additionally be noted that instead of the valve assemblies embodied as 3/3-way valves, other forms of valve assemblies that afford the same possibilities for connection and block can naturally be used. For example, these 3-position valves could each be replaced with two 2-position valves as in the prior art. It is also apparent from the description of the various valve assemblies 14, 14a, and 14c that there are various possibilities for designing valve assemblies having the desired control properties.

Figure 5:
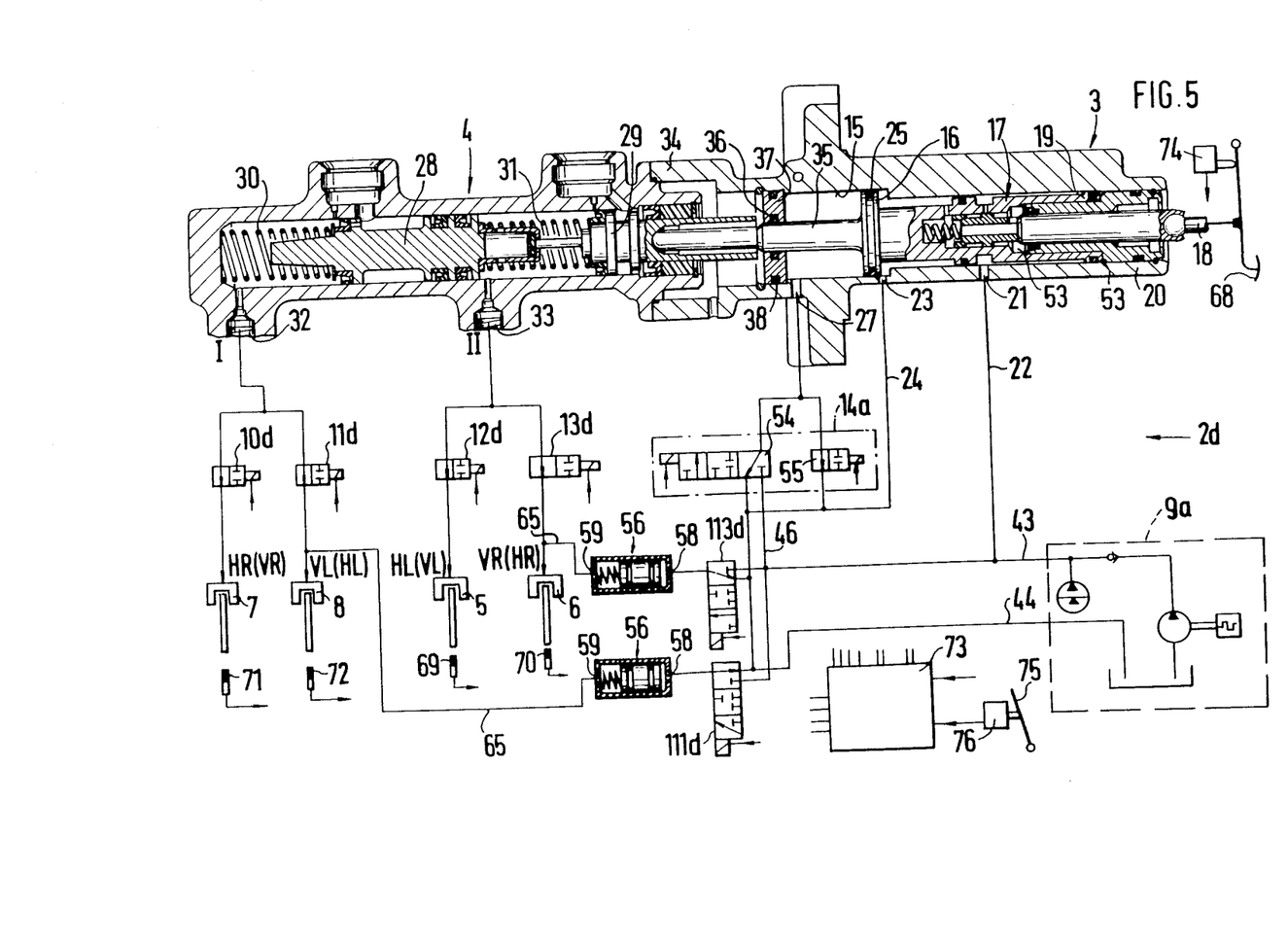

The exemplary embodiment of a brake system 2d shown in FIG. 5 again has, as its essential components, a brake booster 3, which is controllable by means of a brake pedal 68 via a tappet 18; a master brake cylinder 4; wheel brakes 5, 6, 7, 8; a valve assembly 14a having valves 54 and 55 already described; an auxiliary cylinder 15; an auxiliary piston 16 displaceable therein and a pressure source 9a, which is for instance embodied as described above for pumping mineral oil. For this reason, at least one floating piston device 56 is required, which separates the mineral oil from the pressure fluid of the wheel brakes. In the example of FIG. 5, two floating piston devices 56 are provided, one being associated with a wheel brake 6, which is supplied from a brake line connection 33 of the master cylinder 4, and the other being associated with a wheel brake 8, which is supplied from the brake line connection 32. The valve assemblies associated with the wheel brakes 6 and 8 are embodied in the form of 2/2-way valves 11d, 13d and 3/2-way valves 111d, 1113d. In their basic positions, the valves 111d and 113d connect the connections 58 of the floating piston devices with the return line 44. Additionally, however, the valves 111d and 113d also have a holding position in between their end positions, this holding position for instance being taken from the valve 54. In the second end positions, the valves 111d and 113d direct pressure from the pressure source 9a to the connections 58. The combination of the valve assemblies 11d and 111d as well as 13d and 113d again has the advantage that drive slip of a left drive wheel is limitable independently of the drive slip of a right wheel. The 3/3-way valves 111d and 113 can also be replaced with less-expensive 3/2-way valves. This has the same advantage as in the exemplary embodiment of FIG. 4, the valve assembly 14c of which is arranged such that an actuation of the auxiliary piston 16 for preventing wheel locking or skidding can be performed independently of a supplying of brake pressure to wheel brakes for the sake of drive slip limitation, or for the sake of keeping a vehicle stopped prior to starting up when on a hill.

In the vehicle brake system 2d of FIG. 5, a pressure source 9 that pumps the same pressure fluid with which the master brake cylinder 4 is also filled, and for which the exemplary embodiment of FIG. 1 sets the example, can naturally also be used. In that case, then the two floating piston devices 56 can naturally be dispensed with.

As is apparent from the descriptions of the exemplary embodiments, all of these exemplary embodiments, for skid prevention, have auxiliary pistons associated with their brake boosters, and for limiting drive slip and/or for temporarily keeping a vehicle stopped, they all have valve assemblies located between the pressure source supplying the brake booster and the wheel brakes that are actuated, so that brake pressures can be generated by means of pressure from the pressure source, without using the master brake cylinder 4.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A hydraulic vehicle brake assembly having wheel brakes, comprising a master brake cylinder, a brake booster with at least one booster piston, a pressure source adapted to supply the brake booster, an anti-skid device in said assembly having at least one auxiliary piston and at least one valve assembly for interrupting connections between the master brake cylinder and the wheel brakes disposed between the master brake cylinder and the wheel brakes, said anti-skid device further having at least one further valve assembly via which during an anti-skid situation the auxiliary piston can be acted upon with a pressure counter to the operative direction of the booster piston, a control unit (73) connected to wheel rotation sensors (69, 70, 71, 72) and to signal transducers (74, 76) coupled to a brake pedal (68) and to a driving pedal (75) and said control unit is also arranged for triggering said valve assemblies under anti-skid conditions so that between the stopping of a motor vehicle equipped with the assembly and its restarting by depression of the accelerator pedal (75), brake pressure is supplied to wheel brakes with the aid of said pressure source (9, 9a), and said valve assemblies (10, 11, 12, 13, 14; 10a, 11a, 12a, 14a; 10b, 11b, 12b, 13b, 14a; 10c, 11c, 12c, 13c, 14c; 10d, 11d,111d, 12d, 13d, 113d, 14a) being additionally arranged for directing pressure from the pressure source (9, 9a) into at least one of the wheel brakes (5, 6, 7, 8) while simultaneously blocking off a connection between said wheel brake and the master brake cylinder (4), and further that the control unit (73) is arranged to trigger said valve assemblies (10, 11, 12, 13, 14; 10a, 11a; 12a, 14a; 10b, 11b, 12b, 13b, 14a; 10c, 11c, 12c, 13c, 14c; 10d, 11d, 111d, 12d, 13d, 113d, 14a) as a function of additionally predetermined conditions in order to generate brake pressure in at least one of the wheel brakes.

2. A vehicle brake system as defined by claim 1, in which the valve assemblies (11, 13; 11b, 13b; 11c, 12c; 11d, 111d, 13d, 113d) which are disposed in between the master brake cylinder (4) and the wheel brakes of drivable wheels are embodied to function like 3/3-way valves, and further that at least one additional connection (45) connects the pressure source (9, 9a) with the respective wheel brake for drive slip limitation.

3. A hydraulic vehicle brake assembly having wheel brakes, comprising a master brake cylinder, a brake booster with at least one booster piston, a pressure source adapted to supply the brake booster, an anti-skid device in said assembly having at least one auxiliary piston and at least one valve assembly for interrupting connections between the master brake cylinder and the wheel brakes disposed between the master brake cylinder and the wheel brakes, said anti-skid device further having at least one further valve assembly via which during an anti-skid situation the auxiliary piston can be acted upon with a pressure counter to the operative direction of the booster piston, a control unit (73) connected to wheel rotation sensors (68, 70, 71, 72) arranged to ascertain drive slip and connected to signal transducers (74, 76) coupled to a brake pedal (68) and to a driving pedal (75), and said control unit is also arranged for triggering said valve assemblies under anti-skid conditions whenever the drive slip exceeds a predetermined threshold so that between the stopping of a motor vehicle equipped with the assembly and its restarting by depression of the accelerator pedal (75), brake pressure is supplied to wheel brakes with the aid of said pressure source (9, 9a), and said valve assemblies (10, 11, 12, 13, 14; 10a, 11a, 12a, 14a; 10b, 11b, 12b, 13b, 14a; 10c, 11c, 12c, 13c, 14c; 10d, 11d, 111d, 12d, 13d, 113d, 14a) being additionally arranged for directing pressure from the pressure source (9, 9a) into at least one of the wheel brakes (5, 6, 7, 8) while simultaneously blocking off a connection between said wheel brake and the master brake cylinder (4), and further that the control unit (73) is arranged to trigger said valve assemblies (10, 11, 12, 13, 14, 10a, 11a, 12a, 14a; 10b, 11b, 12b, 13b, 14a; 10c, 11c, 12c, 13c, 14c; 10d, 11d, 111d, 12d, 13d, 113d, 14a) as a function of additionally predetermined conditions in order to generate brake pressure in at least one of the wheel brakes.

4. A vehicle brake system as defined by claim 3, in which the valve assemblies (11, 13; 11b, 13b; 11c, 12c; 11d, 111d, 13d, 113d) which are disposed in between the master brake cylinder (4) and the wheel brakes of drivable wheels are embodied to function like 3/3-way valves, and further that at least one additional connection (45) connects the pressure source (9, 9a) with the respective wheel brake for drive slip limitation.

5. A vehicle brake system as defined by claim 1, in which the valve assembly (10a) disposed between the master brake cylinder (4) and the wheel brakes (5, 7) of at least one axle is embodied as a 3/3-way valve, and that the additional connection (45) is connected to the particular valve assembly (14a) that controls the actuation of the auxiliary piston (16) in an anti-skid situation.

6. A vehicle brake system as defined by claim 3, in which the valve assembly (10a) disposed between the master brake cylinder (4) and the wheel brakes (5, 7) of at least one axle is embodied as a 3/3-way valve, and that the additional connection (45) is connected to the particular valve assembly (14a) that controls the actuation of the auxiliary piston (16) in an anti-skid situation.

7. A vehicle brake system as defined by claim 1, in which at least one floating piston device (56) is disposed between the wheel brakes (5, 7, 6, 8) and the pressure source (9a), said pressure source (9a) is provided with a cylinder (57) having connections (58, 59) at opposite ends, a sealingly guided floating piston (60) and a restoring spring (63) are disposed in said cylinder, said spring being compressible via the piston (60) by means of pressure from the pressure source (9a).

8. A vehicle brake system as defined by claim 3, in which at least one floating piston device (56) is disposed between the wheel brakes (5, 7, 6, 8) and the pressure source (9a), said pressure source (9a) is provided with a cylinder (57) having connections (58), 59) at opposite ends, a sealingly guided floating piston (60) and a restoring spring (63) are disposed in said cylinder, said spring being compressible via the piston (60) by means of pressure from the pressure source (9a).

9. A vehicle brake system as defined by claim 2, in which at least one floating piston device (56) is disposed between the wheel brakes (5, 7, 6, 8) and the pressure source (9a), said pressure source (9a) is provided with a cylinder (57) having connections (58), 59) at opposite ends, a sealingly guided floating piston (60) and a restoring spring (63) are disposed in said cylinder, said spring being compressible via the piston (60) by means of pressure from the pressure source (9a).

10. A vehicle brake system as defined by claim 3, in which the valve assembly (14c) disposed between the pressure source (9a) and the auxiliary cylinder (15) includes a 3/2-way valve (66) having a return connection (66a), the 3/2-way valve (66) and the auxiliary cylinder (15) further include a 2/2-way valve (67), whereby at least one of the other valve assemblies (11c, 12c) and the at least one wheel brake is connectable between these two valves (66, 67).

11. A vehicle brake system as defined by claim 5, in which the valve assembly (14c) disposed between the pressure source (9a) and the auxiliary cylinder (15) includes a 3/2-way valve (66) having a return connection (66a), the 3/2-way valve (66) and the auxiliary cylinder (15) further include a 2/2-way valve (67), whereby at least one of the other valve assemblies (11c, 12c) and the at least one wheel brake is connectable between these two valves (66, 67).

12. A hydraulic vehicle brake assembly having wheel brakes, comprising a master brake cylinder, a brake booster with at least one booster piston, a pressure source adapted to supply the brake booster, an anti-skid device in said assembly having at least one auxiliary piston and at least one valve assembly for interrupting connections between the master brake cylinder and the wheel brakes disposed between the master brake cylinder and the wheel brakes, said anti-skid device further having at least one further valve assembly via which during an anti-skid situation the auxiliary piston can be acted upon with a pressure counter to the operative direction of the booster piston, a control unit adapted to electrically actuate and to trigger the valve assemblies under antiskid conditions, and said valve assemblies (10, 11, 12, 13, 14; 10a, 11a, 12a, 14a; 10b, 11b, 12b, 13b, 14a; 10c, 11c, 12c, 13c, 14c; 10d, 11d, 111d, 12d, 13d, 113d, 14a) being additionally arranged for directing pressure from the pressure source (9, 9a) into at least one of the wheel brakes (5, 6, 7, 8) while simultaneously blocking off a connection between said wheel brake and the master brake cylinder (4), and further that the control unit (73) is arranged to trigger said valve assemblies (10, 11, 12, 13, 14; 10a, 11a, 12a, 14a; 10b, 11b, 12b, 13b, 113d, 14a) as a function of additionally; predetermined conditions in order to generate brake pressure in at least one of the wheel brakes, and at least one floating piston device (56) is disposed between the wheel brakes (5, 6, 7, 8) and the pressure source (9a), said pressure source (9a) is provided with a cylinder (57) having connections (58, 59) at opposite ends a sealingly guided floating piston (6) and a restoring spring (63) are disposed in said cylinder, said spring being compressible via the piston (60) by means of pressure from the pressure source (9a).

13. A vehicle brake system as defined by claim 12, in which the valve assembly (14c) disposed between the pressure source (9a) and the auxiliary cylinder (15) includes a 3/2-way valve (66) having a return connection (66a), the 3/2-way valve (66) and the auxiliary cylinder (15) further include a 2/2-way valve (67), whereby at least one of the other valve assemblies (11c, 12c) and the at least one wheel brake is connectable between these two valves (66, 67).

14. A vehicle brake system as defined by claim 3, in which a safety pressure relief valve comprising a controllable 2/2-way valve (55) is disposed between the auxiliary cylinder (15) and a return line (44).

15. A vehicle brake system as defined by claim 5, in which a safety pressure relief valve comprising a controllable 2/2-way valve (55) is disposed between the auxiliary cylinder (15) and a return line (44).

16. A vehicle brake system as defined by claim 12, in which a safety pressure relief valve comprising a controllable 2/2-way valve (55) is disposed between the auxiliary cylinder (15) and a return line (44).

17. A vehicle brake system as defined by claim 10, in which a safety pressure relief valve comprising a controllable 2/2-way valve (55) is disposed between the auxiliary cylinder (15) and a return line (44).

18. A vehicle brake system as defined by claim 1, in which at least two floating piston devices (56), each having a cylinder (57), a piston (60) and a restoring spring (63), are interposed between at least two wheel brakes (6, 8) and the pressure source and further that the floating piston devices (56) are each connectable via individual respective valve assemblies (111d, 113d) to the pressure source (9a) and to a return line (44) that leads back to the pressure source.

19. A vehicle brake system as defined by claim 3, in which at least two floating piston device (56), each having a cylinder (57), a piston (60) and a restoring spring (63), are interposed between at least two wheel brakes (6, 8) and the pressure source and further that the floating piston devices (56) are each connectable via individual respective valve assemblies (111d, 113d) to the pressure source (9a) and to a return line (44) that leads back to the pressure source.

20. A vehicle brake system as defined by claim 2, in which at least two floating piston devices (56), each having a cylinder (57), a piston (60) and a restoring spring (63), are interposed between at least two wheel brakes (6, 8) and the pressure source and further that the floating piston devices (56) are each connectable via individual respective valve assemblies (111d, 113d) to the pressure source (9a) and to a return line (44) that leads back to the pressure source.

21. A hydraulic vehicle brake assembly having wheel brakes, comprising a master brake cylinder, a brake booster with at least one booster piston, a pressure source adapted to supply the brake booster, an anti-skid device in said assembly having at least one auxiliary piston and at least one valve assembly for interrupting connections between the master brake cylinder and the wheel brakes disposed between the master cylinder and the wheel brakes, said anti-skid device further having at least one valve assembly via which during an anti-skid situation the auxiliary piston can be acted upon with a pressure counter to the operative direction of the booster piston, a control unit (73) connected to wheel rotation sensors (69, 70, 71, 72) arranged to ascertain drive slip and is adapted to emit control signals to electrically actuate and to trigger said valve assemblies under anti-skid conditions whenever the drive slip exceeds a predetermined threshold, and said valve assemblies (10, 11, 12, 13, 14; 10a, 11a, 12a, 14a; 10b, 11b, 12b, 13b, 14a; 10c, 11c, 12c, 13c, 14c; 10d, 11d, 111d, 12d, 13d, 113d, 14a) being additionally arranged for directing pressure from the pressure source (9, 9a) into at least one of the wheel brakes (5, 6, 7, 8) while simultaneously blocking off a connection between said wheel brake and the master brake cylinder (4), and further that the control unit (73) is arranged to trigger said valve assemblies (10, 11, 12, 13, 14; 10a, 11a, 12a, 14a; 10b, 11b, 12b, 13b, 14a; 10c, 11c, 12c, 13c, 14c; 10d, 11d, 111d, 12d, 13d, 113d, 14a) as a function of additionally predetermined conditions in order to generate brake pressure in at least one of the wheel brakes, and at least one floating piston (56) is disposed between the wheel brakes (5, 6, 7, 8) and the pressure source (9a), said pressure source (9a) is provided with a cylinder (57) having connections (58, 59) at opposite ends, a sealingly guided floating piston (60) and a restoring spring (63) are disposed in said cylinder, said spring being compressible via the piston (60) by means of pressure from the pressure source (9a).

22. A hydraulic vehicle brake assembly having wheel brakes, comprising a master brake cylinder, a brake booster with at least one booster piston, a pressure source adapted to supply the brake booster, an anti-skid device in said assembly having at least one auxiliary piston and at least one valve assembly for interrupting connections between the master brake cylinder and the wheel brakes, said anti-skid device further having at least one further valve assembly via which during an anti-skid situation the auxiliary piston can be acted upon with a pressure counter to the operative direction of the booster piston, a control unit adapted to electrically actuate an to trigger the valve assemblies under anti-skid conditions, and said valve assemblies (10, 11, 12, 13, 14; 10a, 11a, 12a, 14a; 10b, 11b, 12b, 13b, 14a; 10c, 11c, 12c, 13c, 14c; 10d, 11d, 111d, 12d, 13d, 113d, 14a) being additionally arranged for directing pressure from the pressure source (9, 9a) into at least one of the wheel brakes (5, 6, 7, 8) while simultaneously blocking off a connection between said wheel brake and the master brake cylinder (4), and further that the control unit (73) is arranged to trigger said valve assemblies (10, 11, 12, 13, 14; 10a, 11a, 12a, 14a; 10b, 11b, 12b, 13b, 14a; 10c, 11c, 12c, 13c, 14c; 10d, 11d, 111d, 12d, 13d, 113d, 14a) as a function of additionally predetermined conditions in order to generate brake pressure in at least one of the wheel brakes, and at least two floating piston devices (56), each having a cylinder (57), a piston (60) and a restoring spring (63), are interposed between at least two wheel brakes (6, 8) and the pressure source, and further that the floating piston devices (56) are each connectable via individual respective valve assemblies (111d, 113d) to the pressure source (9a) and to a return line (44) that leads back to the pressure source.

23. A hydraulic vehicle brake assembly having wheel brakes, comprising a master brake cylinder, a brake booster with at least one booster piston, a pressure source adapted to supply the brake booster, an anti-skid device in said assembly having at least one auxiliary piston and at least one valve assembly for interrupting connections between the master brake cylinder and the wheel brakes said anti-skid device further having at least one further valve assembly via which during an anti-skid situation the auxiliary piston can be acted upon with a pressure counter to the operative direction of the booster piston, a control unit (73) connected to wheel rotation sensors (69, 70, 71, 72) arranged to ascertain drive slip and is adapted to emit control signals to electrically actuate and to trigger said valve assemblies under anti-skid conditions whenever the drive slip exceeds a predetermined threshold, and said valve assemblies (10, 11, 12, 13, 14; 10a, 11a, 12a, 14a; 10b, 11b, 12b, 13b, 14a; 10c, 11c, 12c, 13c, 14c; 10d, 11d, 111d, 12d, 13d, 113d, 14a) being additionally arranged for directing pressure from the pressure source (9, 9a) into at least one of the wheel brakes (5, 6, 7, 8) while simultaneously blocking off a connection between said wheel brake and the master brake cylinder (4), and further that the control unit (73) is arranged to trigger said valve assemblies (10, 11, 12, 13, 14; 10a, 11a, 12a, 14a; 10b, 11b, 12b, 13b, 14a; 10c, 11c, 12c, 13c, 14c; 10d, 11d, 111d, 12d, 13d, 113d, 14a) as a function of additionally predetermined conditions in order to generate brake pressure in at least one of the wheel brakes, and at least two floating piston device (56), each having a cylinder (57), a piston (60) and a restoring spring (63), are interposed between at least two wheel brakes (6, 8) and the pressure source and further that the floating piston devices (56) are each connectable via individual respective valve assemblies (111d, 113d) to the pressure source (9a) and to a return line (44) that leads back to the end pressure source.

* * * * *